Feb. 20, 1923.
J. BOOKS
CLAMP
Filed June 3, 1922
1,446,374
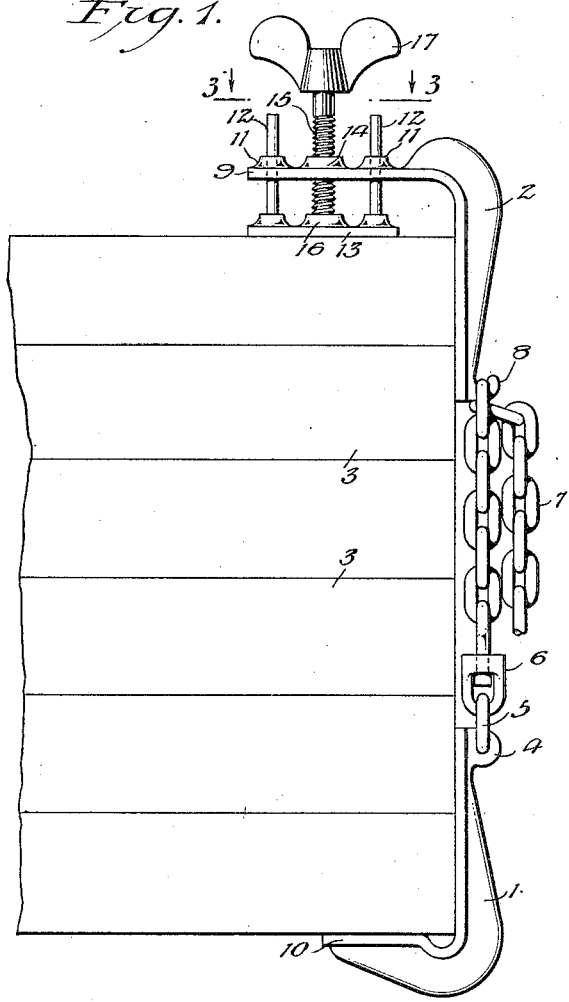
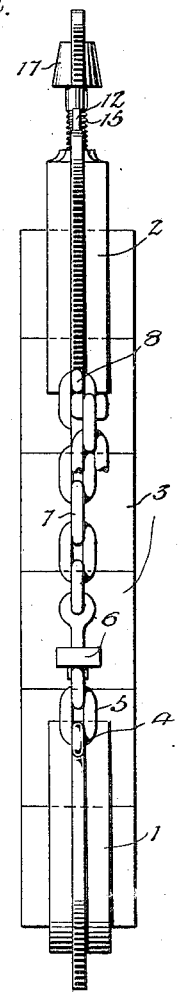
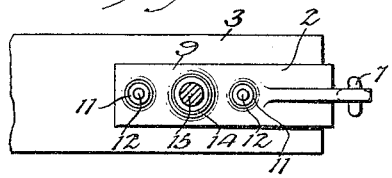
WITNESSES
INVENTOR
Joseph Books
BY
ATTORNEYS Patented Feb. 20, 1923.

1,446,374

UNITED STATES PATENT OFFICE.

JOSEPH BOOKS, OF McKEESPORT, PENNSYLVANIA.

CLAMP.

Application filed June 2, 1922. Serial No. 565,717.

*To all whom it may concern:*

Be it known that I, JOSEPH BOOKS, a citizen of the United States, and a resident of McKeesport, in the county of Allegheny and State of Pennsylvania, have invented a new and Improved Clamp, of which the following is a full, clear, and exact description.

This invention relates to improvements in clamps and more particularly to adjustable clamps, an object of the invention being to provide a clamp in which the two clamping brackets are connected by a chain which is quickly adjustable to enlarge or contract the clamp in accordance with the work to be done.

A further object is to provide a clamp which, when not in use can be packed or stored in a relatively small space, and which will be strong and durable in use.

With these and other objects in view, the invention consists in certain novel features of construction and combinations, and arrangement of parts, as will be more fully hereinafter described and pointed out in the claims.

In the accompanying drawings—

Figure 1 is a view in side elevation illustrating my improved clamp in operative position.

Figure 2 is an end view of Figure 1.

Figure 3 is a view in section on the line 3—3, of Figure 1.

1 and 2 represent the angle brackets, or jaws of my improved clamp, and 3 represents the article, or work clamped.

The inner faces of the angle brackets 1 and 2 are at right angles to each other so that one arm or member of the bracket 1 is adapted to engage the work directly and constitute a jaw.

This bracket 1 is formed with an eye 4 receiving a link 5, which is connected to a swivel 6 the latter secured to one end of the chain 7.

The other bracket 2, is formed on one end with a hook 8 adapted to receive any link of the chain 7, the swivel 6 permitting the chain to freely turn so that every link thereof, may function as a direct coupling with the hook 6.

Bracket 2 in its arm 9, which is normally parallel to the arm or jaw 10 of bracket 1, is formed with sleeves 11, which receive and guide posts 12 on a clamping plate 13. The arm 9 is provided between the sleeves 11, with an internally screw threaded sleeve 14, in which a clamping screw 15 is adjustable. The lower end of this clamping screw 15 engages a bearing 16 centrally of the plate 13, and a winged head 17 is provided on the outer end of the screw 15 to permit adjustment thereof to vary the position of the plate 13, and hence clamp the work 3 to a desired pressure.

It will be noted that with a clamp such as above described, the brackets 1 and 2 thereof, may be positioned on the work and the chain 7 adjusted to the desired length and engaged over hook 8, when the screw 15 can be operated to effectually clamp the work. Such a clamp is quickly positioned and most effectual in use, and when not in use can be stored in a relatively small space.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

A clamp of the character described, comprising two right angle brackets, a chain having swiveled connection to one bracket, a hook on the other bracket adapted to receive any of the links of the chain, one of said brackets having a pair of post guide openings and a screw threaded opening between them, a clamping plate parallel to members of both brackets, posts on the clamping plate movable through the said openings, and an adjusting screw located in the screw threaded opening and bearing against the intermediate portion of the clamping plate.

JOSEPH BOOKS.